United States Patent [19]

Bailey, Jr.

[11] 3,771,037
[45] Nov. 6, 1973

[54] SOLID STATE CONTROLLER THREE-AXES CONTROLLER

[75] Inventor: Charles L. Bailey, Jr., Pasadena, Tex.

[73] Assignee: The United States of America as represented by the Administrator of the National Aeronautics and Space Administration, Washington, D.C.

[22] Filed: Mar. 15, 1973

[21] Appl. No.: 341,662

[52] U.S. Cl..................... 318/580, 318/628, 244/83
[51] Int. Cl.......................... B64c 13/16, G05d 1/00
[58] Field of Search....................... 318/580, 628, 2; 244/83

[56] References Cited
UNITED STATES PATENTS

| 2,414,102 | 1/1947  | Hull et al........................ 318/628 X |
| 2,787,746 | 4/1957  | Redmond............................ 318/580   |
| 3,106,371 | 10/1963 | Brannin et al................... 318/580 X |
| 3,028,126 | 4/1962  | Holleman......................... 318/628 X |

Primary Examiner—B. Dobeck
Attorney—Marvin J. Marmock et al.

[57] ABSTRACT

Disclosed is a controller principally for a flight craft and utilizing a single control element which can be manipulated for control of motion relative to pitch, roll, and yaw axes, these axes being mutually perpendicular to one another. The control element is mounted in a base member for pivotal movement about a longitudinal "yaw" axis extending through the control element and the degree of pivotal movement controls a yaw function. The base member is mounted for pivotal movement about a "roll" axis, which is perpendicular to the longitudinal "yaw" axis and the degree of pivotal movement controls a "roll" function. The control element has a handle pivotally mounted on it for pivotal movement about a "pitch" axis which is perpendicular to the longitudinal "yaw" axis and to the "roll" axis. The handle can be manipulated to provide pivotal movmeent about any one or more of the axes individually or contemporaneously. Spring biased centering mechanisms are provided for "zero" settings of the handle and control element. The mountings for pivotal movement include shafts along the respective axes which are part of a solid state transducer so that pivotal rotation about any of the axes directly couples rotation of a shaft to an electrical transducer for a direct readout of the pivotal position. Each transducer includes three Hall Effect generators equiangularly spaced about an axis and a six pole magnetic plate coupled to the rotational shaft for producing the direct electrical read out. The use of multiple generators provides triple redundancy as a safety factor.

10 Claims, 8 Drawing Figures

United States Patent
Bailey, Jr.
[11] 3,771,037
[45] Nov. 6, 1973
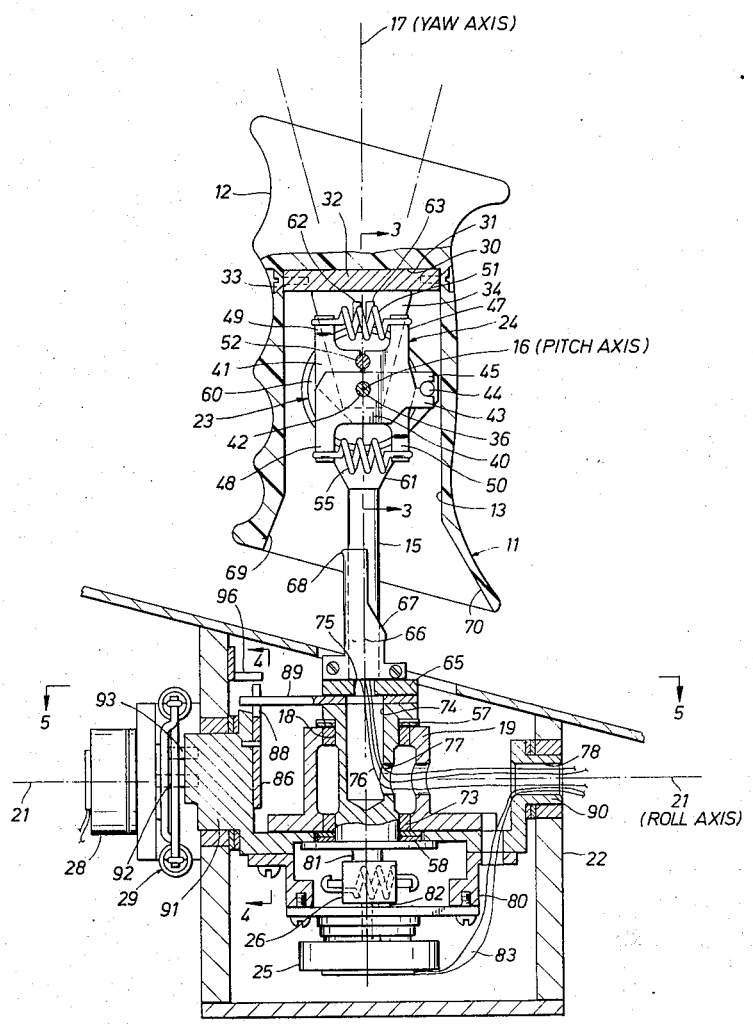

PATENTED NOV 6 1973 3,771,037

SOLID STATE CONTROLLER THREE-AXES CONTROLLER

ORIGIN OF THE INVENTION

The invention described herein was made by an employee of the United States Government and may be manufactured and used by or for the Government of the United States of America for governmental purposes without the payment of any royalties thereon or therefor.

BACKGROUND OF THE INVENTION

This invention relates to controllers for flight aircraft and in particular to hand controllers where a single hand control element is necessary or desirable to provide independent and conjunctive control functions about one or more axes.

It may readily be appreciated that use of a single controlling handle grip for obtaining control over rotational movement about three mutually perpendicular axes has inherent design complexities. The axes usually preferred to are the pitch, roll, and yaw axes relative to a flight craft. The use of switches, gears, cams and other types of hardware has not been particularly successful in obtaining reliable control results and to obtain reliability, the equipment has become extremely complex. Also, the sensor mechanisms for determining the degree of rotation have also been a source of difficulty in obtaining reliability and accuracy over the control range.

SUMMARY OF THE INVENTION

In the present invention a flight controller consists of a handle grip which is mounted on a longitudinally extending control element. The handle grip is pivotally mounted on the control element about a "pitch" axis which is perpendicular to the longitudinal axis through the control element. The pivotal mounting includes a resilient force mounting mechanism which centers the grip relative to the control element. The handle grip can be rotated against the resilient force in either rotative direction about the pitch axis. Rotation of the handle grip produces a direct rotation of a transducer element in a transducer which provides an electrical indication of the rotative movement.

The control element is rotationally supported in a base element or member for rotation about its longitudinal or yaw axis. The control element mounting includes a resilient force mounting mechanism which centers the rotational position of the control element relative to the base element. The control element can be rotated by the handle grip relative to the base element against the resilient force in either rotative direction about the longitudinal axis. Rotation of the control element produces a direct rotation of a transducer which provides an electrical indication of the rotative movement.

The base element for the control element is rotatively supported for rotation about a roll axis which is perpendicular to both the yaw and pitch axes. The base element mounting includes a resilient force mounting mechanism which centers the rotational position of the base elements relative to a support on the craft. The base element can be rotated against the resilient force in either rotative directions about the roll axis. Rotation of the base element produces a direct rotation of a transducer element in a transducer which provides an electrical indication of the rotative movement.

The transducer preferably uses Hall Effect generators and a magnet arrangement; however, light emitter-photovoltaic cells could also be used. In the preferred type of transducer, the pivotal mounting with respect to the various axis includes a shaft attached to a disc magnet in a transducer, the magnet having six magnetic pole pieces. Three equiangularly spaced Hall Effect generators are disposed in a transducer with respect to the pole pieces to provide solid state transducers where any one of the generators is sufficient to provide a controlling function. Thus, there is a direct coupling of the rotative or pivotal mounting to a solid state transducer which is very reliable because of the redundancy in the number of generators.

BRIEF DESCRIPTION OF THE DRAWINGS

The invention may best be understood by reference to the following drawings included as a part of this specification, and in which.

DESCRIPTION OF THE PREFERRED EMBODIMENT

To fully appreciate the application of this invention, it is essential to understand the possible rotational movement of a three dimensional finite body about three mutually perpendicular axes which intersect at the center of an object. Consider a three dimensional object such as a rectangular enclosed box consisting of two sides, a top and a bottom, and two ends. Extending through the center of the box and through the centers of the ends in a direction parallel to the top and sides is an axis about which the box may rotate and this axis is designated as a roll axis. Perpendicular to this axis and extending vertically through the center of the top and bottom is an intersecting axis which is designated a yaw axis. Mutually perpendicular to the roll and yaw axis and extending through the center of the sides is an axis designated the pitch axis. It will be appreciated that the box may be rotated about any of the axes independently of any rotation about the other two axes or may be rotated with respect to all three axes simultaneously. Relating now to a space craft environment, a flight controller is desired with a single control element which can independently or conjunctively produce a control function with respect to pitch, roll and yaw axes of the craft.

Figure 1:
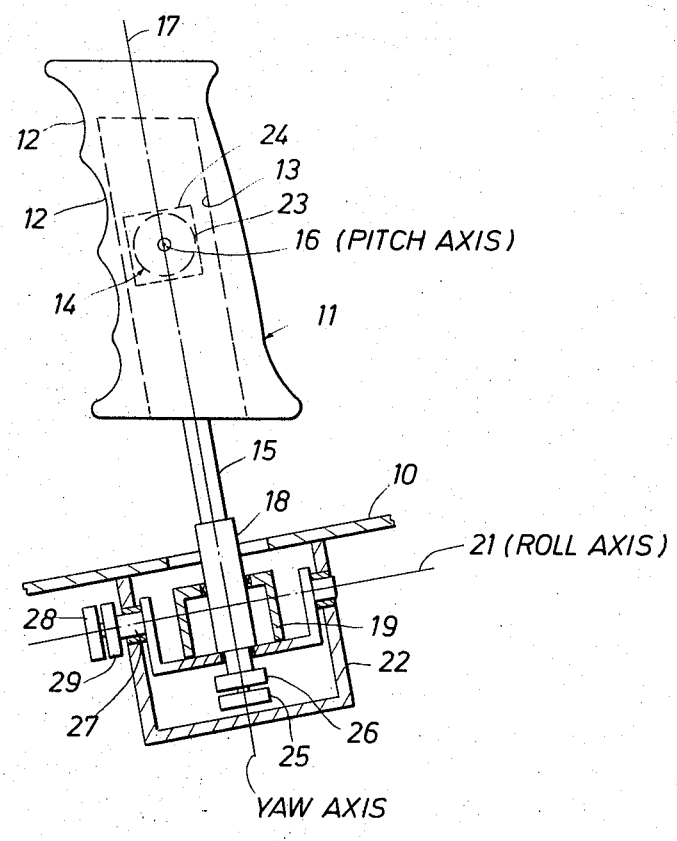
FIG. 1 is a schematic illustration of a flight controller including the support arrangement for obtaining pivotal movement about three mutually perpendicular axes by operation of a hand grip control.

Referring now to the drawings, in FIG. 1 a face plate 10 of a housing (not shown) supports a mechanism which includes a hand grip controller 11. The hand grip controller 11 can be manipulated to provide three mutually independent controls about three mutually perpendicular axes which can be designated as the pitch, roll and yaw axes. The arrangement, however, also permits the simultaneous or conjunctive control with respect to any two or more of the axes.

The hand grip 11 has an outer configuration which is adapted for comfortable grasp by an operator's hand. This configuration includes identations 12 along a forward surface to accept the fingers of an operator, thus permitting the hand grip to be firmly grasped by the operator. The hand grip has a hollowed-out interior 13 which has a roughly rectangular cross-section sized to receive a pitch control means 14. The hand grip 11 is attached to the pitch control means 14 and rotatably mounted with respect to a pitch axis 16 and to a handle support 15. The pitch control means 14 are actuated by clockwise and counterclockwise rotations of the hand grip 11 about the pitch axis 16 which is centrally located relative to the hand grip and intersects a longitudinal axis extending through the handle support 15. The pitch axis 16 is in a perpendicular intersecting relationship to the longitudinal axis 17 of the handle support 15.

The handle support 15 is attached to a yaw journal 18 which is pivotally or rotatively mounted in a housing 19. Thus, the yaw journal 18 can be moved clockwise and counterclockwise with respect to the housing 19 about a yaw axis 17 by movement of the handle support. The yaw axis 17 for the journal 18 is arranged perpendicular to the pitch axis 16, and intersects the longitudinal axis 17 of the handle support 15. The housing 19 which carries the yaw journal 18 is pivotally or rotatably mounted in a housing 22 of a support for rotation about roll axis 21 which is perpendicular to the longitudinal axis 17 and to the pitch axis 16. Thus, clockwise or counterclockwise rotation of the handle support 15 about the roll axis 21 with respect to the housing 22 can be obtained.

The pitch control means 14 includes a transducer 23 to indicate rotational position of the grip 11 abou the pivot axis 16 and a force feel mechanism 24 which provides a resilient stabilizing force to maintain the grip 11 in a neutral position. The yaw journal 18 is attached to a transducer 25 which indicates rotational position of the journal 18 about the yaw axis 17 and a force feel mechanism 26 which provides a resilient stabilizing force to maintain the handle support 15 in a neutral position. The housing 19 has a journal 27 attached to a transducer 28 which indicates rotational position of the journal with respect to the roll axis and a force feel mechanism 29 which provides a resilient stabilizing force to maintain the housing 19 in a neutral position.

It will be appreciated upon further inspection that each of the means for movement about the three principal axes of movement can be actuated independently of the other two means, or two or three of the means can be actuated at the same time, or all three of the means can be actuated at the same time.

Figure 2:
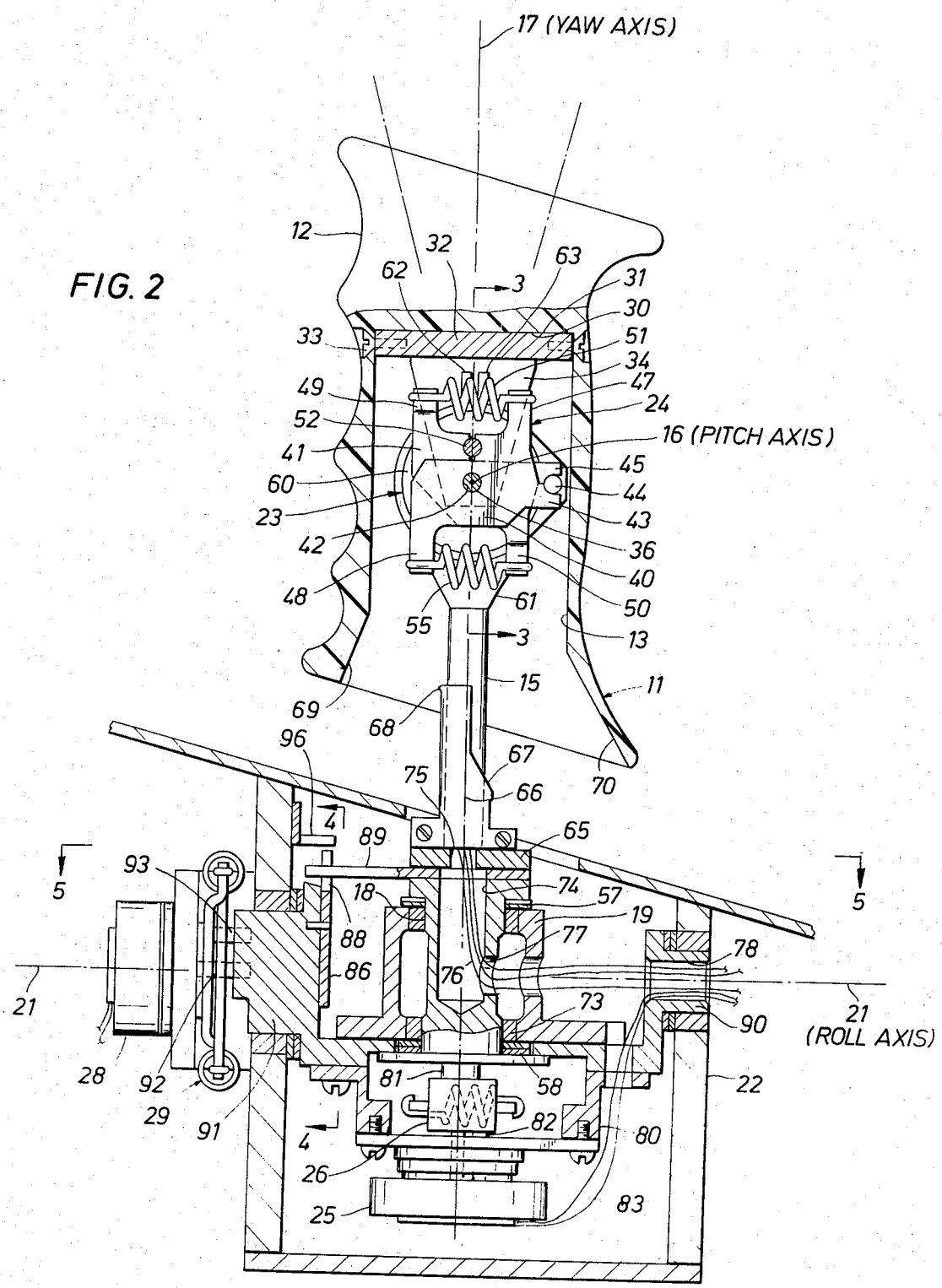
FIG. 2 is a detailed cross-sectional side view of the flight controller which includes a hand grip and a housing.

Referring now to FIG. 2, located within the hollow interior of the hand grip are the pitch control means for controlling the pitch angle. The pitch control means consists primarily of a force feel mechanism, a transducer for producing direct electrical current of varying intensity and polarity, and electrical conductors for transmitting the current produced by the transducer to the flight means for controlling the pitch of a craft.

Figure 3:
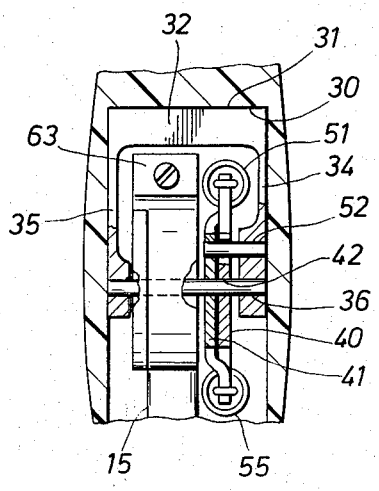
FIG. 3 is a cross-sectional end view of the hand grip taken along line 3—3 of FIG. 2.

The hand grip 11 has a hollow interior 13 with a generally rectangular cross-section so that it fits over the transducer 23 and a force feel mechanism 24. The hand grip 11 has an upper, internal flat surface 30 which rests upon the upper flat surface 31 of a rectangularly shaped base plate 32. The base plate 32 and hand grip 11 are securely attached to one another by screws 33. The base plate 32 has depending angularly shaped legs 34 and 35, as best seen in FIG. 3, on the longitudinal sides of the base plate 32 to form an inverted stirrup configuration. Near the lower ends of the legs a pitch axis pin 36 extends from one leg to the other and is attached to the legs 34 and 35. The pitch axis pin 36 is a part of the driving shaft for a transducer 23. Thus, the hand grip 11 may be rotated either clockwise or counterclockwise about the axis of the pitch axis pin 36 and produce a corresponding rotation of the pitch axis pin and a corresponding indication in the pitch transducer 23.

Figure 6:
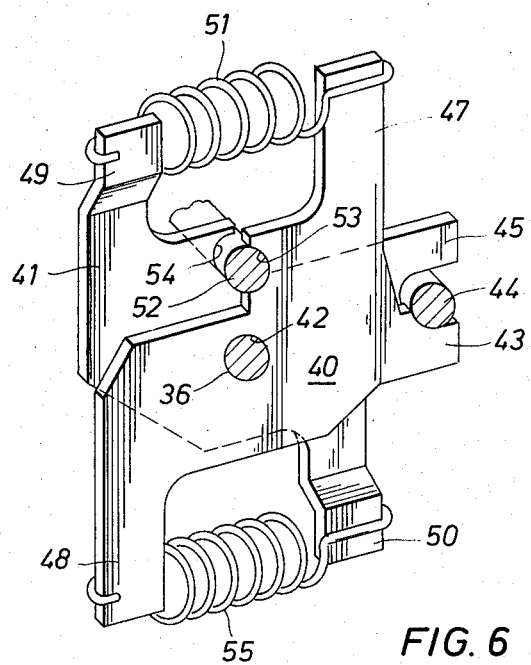
FIG. 6 is a side view of a force feel scissors mechanism.

The force feel means 24, which is also illustrated in detail in FIGS. 3 and 6, is a resiliently biased mechanical device for maintaining the hand grip 11 in a neutral vertical position relative to a handle support and for providing mechanical resistance to rotation of the hand grip relative to the handle support. The force feel 24 includes forward and rearward plate members 40 and 41 each having a central opening 42 which rotatably receives the pitch axis pin 36. The forward plate 40 has a central body portion from which a lateral and horizontal projecting part 43 is arranged to engage the underside of a stop pin 44 which secured to the handle support 15. The stop pin 44 is perpendicular to the handle support and is arranged with its pin axis in a horizontal plane which intersects the axis of the pitch axis pin 36. The rearward plate 41 has a central body portion from which a lateral and horizontal projecting part 45 is arranged to engage the upperside of the stop pin 44. Thus, the forward plate 40 cannot be rotated in a counterclockwise direction because of engagement with the stop pin 44 and the rearward plate 41 cannot be rotateded in a clockwise direction because of engagement with the stop pin 44.

The forward plate 40 has an upwardly extending tang portion 47 which is disposed to one side of the pitch axis pin 36 and a downward extending tang portion 48 which is disposed on the other side of the pitch axis pin 36. The rearward plate 41 has an upwardly extending tang portion 49 which is disposed in line and above the downwardly extending tang portion 48 on the forward plate. The rearward plate 41 also has a downwardly extending tang portion 50 which is disposed below and in line with the upwardly extending tang portion 47 of the forward plate 40. As shown in FIGS. 3 andd 6, thee upper and lower tang portions 49 and 50 of the rearward plate member 41 are offset toward the forward plate member 40 to align the upper and lower tang portions of the forward and rearward plate members in the same plane. The upper tang portions 47 and 49 of the forward and rearward plate members are coupled to one another but the relative motion is prevented by engagement of the laterally projecting parts 43 and 45 with the stop pin 44. A lower spring 55 resiliently couples the lower tang portions 48 and 50 to one another and is cumulative to the effect of the upper spring 51.

Along a vertical plane which extends through the pitch axis pin 36, a stirrup drive pin 52 is attached to one of the depending legs 35 of the base member 32. The stirrup drive pin 52 extends inwardly past both the forward and rearward plate members 40 and 41 which have semicircular recesses 53 and 54 (FIG. 6) sized to accommodate the pin. The legs 34 and 35, it will be recalled, are attached to the pitch axis pin 36 and when the base member 32 is moved counterclockwise about the pin axis 16, the drive pin 52 will act on the rearward plate member 41 moving it counterclockwise about the pin axis 16. At the same time the forward plate 40 remains stationary because the lateral projection 43 is in engagement with the stop pin 44. The springs 51 and 55 are tensioned by such a movement. Upon release of such a counterclockwise force to the rearward plate 41, the spring force will return the rearward plate 41 to its neutral position. A clockwise force applied to the forward plate 40 will cause a tensioning of the springs while the rearward plate 41 remains stationary and the effect will be as described above.

As best shown in FIG. 2, the transducer means has an outer cylindrical configuration 60 which permits its mounting in cylindrical recess in a mounting base 61 on a handle support 15. The cylindrical recess has a split upper end defined by spaced apart ears 62, 63 which can be bolted together to firmly fix the transducer in the recess. The support stop pin 44 is fixably attached to the mounting base 61. In FIG. 3, the transducer driving shaft 36 is seen extending through the force feel and transducer and the shaft 36 is attached to the interior legs 34 and 35 so that as the hand grip 11 is rotated relative to the handle support 15, the shaft 36 rotates with the hand grip. The stirrup drive pin 52 is fixably attached to the left interior leg 35 of the hand grip so that as the hand grip is rotated clockwise or counterclockwise about the transducer driving shaft 36, the stirrup drive pin 52 moves in a clockwise or counterclockwise direction and engages the semicircular indentations of the forward or rearward plates thereby tensioning the upper and lower springs of the force feel. The transducer driving shaft 36 is fixably connected to the rotor of the pitch transducer so that as the transducer driving shaft is rotated by the rotation of the hand grip 11 and the shaft 36, the rotor rotates an equivalent number of degrees relative to the transducer housing inducing an electrical direct current in the transducer, which will be discussed in greater detail later. It is, however, noted that there is direct coupling of the transducer shaft to the hand grip. The hand grip 11 is fixably mounted to the hand grip mounting base 32, which is fixably attached to the handle support by conventional means such as screws and may be readily removed for inspection and maintenance of the pitch force feel and transducer.

The handle support 15 may be tubular in cross-section with a longitudinal passageway therein for the passage of electrical conductors. Thus, the electrical conductors for transmitting the current induced in the transducer 23 extend from the pitch transducer through the hollow handle support to a housing below.

The handle support 15 has at its lower end a handle support mounting base 65 which attaches to an assembly on the housing 22 which is constructed to permit two additional directions of movement, i.e. clockwise and counterclockwise rotation of the handle support 15 about its longitudinal or yaw axis for controlling yaw as well as clockwise and counterclockwise rotation of the handle support about a roll axis perpendicular to the pitch axis.

Also attached to the handle support 15 is a stop plate 66 which has forward and rearward stops 67 and 68, respectively, arranged to engage interior surfaces 69 and 70 of the hand grip 11. Thus, the degree of rotation is limited by the stop plate 66 and hand grip 11.

The handle support mounting base 65 is attached to an upper portion of the yaw journal 18 which is designed to be rotatable within a yaw journal housing 19 which is also pivotally mounted. The yaw journal 18 is rotatively mounted in the yaw journal housing 19 by means of upper and lower bearings 72 and 73. Upper and lower thrust bearing plates 57 and 58 are provided between shoulders on the journal housing 19 and on the journal 18 to retain the journal 18 in the housing 19. Thus, the yaw journal 18 can be rotated clockwise and counterclockwise about a longitudinal axis 17 which is aligned with the longitudinal axis through the handle support. The yaw journal 18 is a generally cylindrical body with a hollowed out or recessed interior 74 which is provided with an opening 75 in its upper end through which the electrical conductors 76 from the handle support pass, and further provided with an opening 77 intermediate of its length through which the pitch electrical conductors may pass. An opening 78 is provided in the journal housing 19 for the passage of electrical conductors through the assembly.

Attached to the lower surface of the journal housing 19 is a housing 80 which encloses a force feel means 26 and to which a transducer means 25 is attached. The transducer driving shaft 81 extends through the force feel 26 and rotatably supports the forward and rearward plate members of the force feel means 26. The shaft 81 is attached to the journal 18 along the longitudinal axis 17. A stop pin 82 extends upwardly from the housing 80 and is disposed between the lateral projections of the plate members. An offset drive pin (not shown) is attached to the journal 18 and is adapted to be centered by the force feel 26. The force feel means 26 is constructed and arranged as described heretofore with respect to FIG. 6. The electrical conductors 83 for transmitting the electrical direct current induced in the transducer are passed from the transducer through an opening 78 in the roll housing.

As the hand grip 11 and handle support 15 are rotated in a clockwise direction, and yaw journal 18 rotates an equivalent number of degrees relative to the yaw journal housing 19 so that the drive pin actuates a plate of the yaw force feel 26 against the resistance of its spring force, and further rotates the yaw rotor of the yaw transducer 25 thereby inducing an electrical direct output current in the yaw transducer. The clockwise and counterclockwise rotations of the handle support relative to the housing are restricted to a fixed degree of rotation by means of the yaw limit stop assembly 85 which may be seen in greater detail in FIG. 4.

Figure 4:
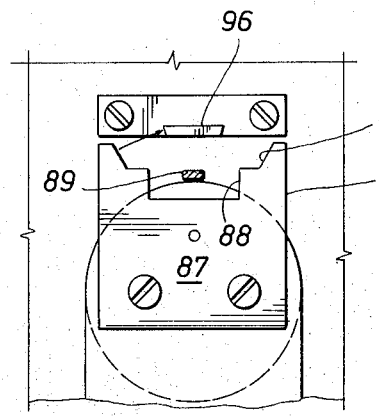
FIG. 4 is a view of the roll axis limit stop assembly taken along line 4—4 of FIG. 2.
Figure 5:
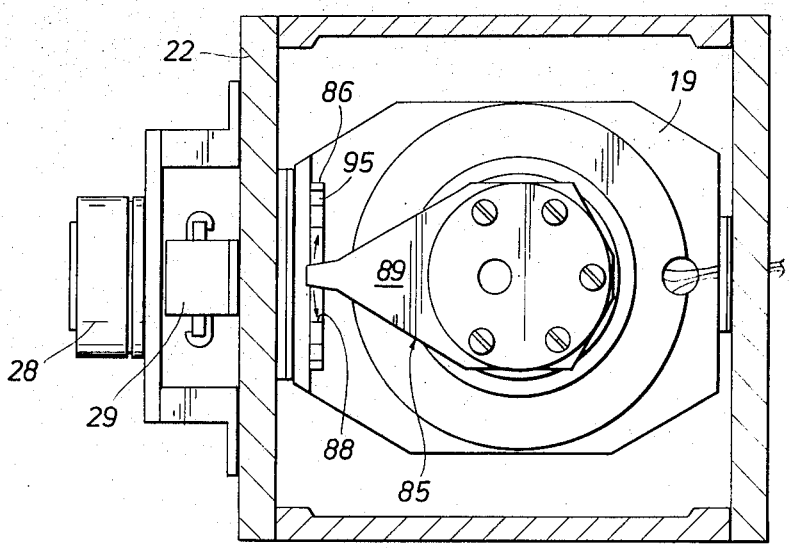
FIG. 5 is a top view of the housing and yaw axis limit stop assembly taken along line 5—5 of FIG. 2, and further illustrating a top view of the roll axis transducer assembly.

As shown in FIGS. 2 and 4, the yaw limit stop assembly includes a yaw and roll axis stop plate 86 attached to a vertical side of the yaw journal housing 19. The stop plate 86 has a first central body portion 87 and a first machined recess 88 to provide a limiting function with respect to a yaw axis stop tang 89. The recess 88 in the stop plate 86 has vertical sides located equidistantly to either side of a vertical axis which intersects the roll axis 21. The yaw axis stop tang 89 is attached to the yaw journal 18 and extends generally perpendicular therefrom so that a projecting portion is disposed between the vertical sides of the recess 88. Thus, when the stop projection on the tang 89 is disposed between the vertical sides of the recess 88, the clockwise and counterclockwise rotation of the yaw journal 18 about the longitudinal yaw axis is limited by the engagement of the stop projection with one of the sides of the recess 88.

The yaw journal housing 19 has spaced apart journals 90, 91 on a common roll axis 21 which intersects the vertical or longitudinal yaw axis 17. The journals 90, 91 are pivotally received in bearings in a fixed housing 22 on the vehicle so that the yaw journal housing 19 can be pivoted clockwise and counterclockwise with respect to the housing 22 about the roll axis 21. At one journal 91 is a force feel mechanism 29 and transducer 28 which are mounted between the fixed housing 22 and the journal 91. The transducer pin 92 is aligned with and located on the roll axis 21 and attached to the roll journal 91. The drive pin 93 for the force feel mechanism 29 is offset from the transducer pin on the journal and is used to drive the plates of the force feel 29 in a manner which has been described heretofore. The forward and rearward plates of the force feel are pivotally mounted on the transducer pin. A stop pin (not shown) is located between the plate and attached to the fixed housing.

To limit the rotation of the yaw journal housing 19 about the roll axis, the stop plate 86 on the yaw housing has an upper recess 95 with sloped or angled surface portions. A roll axis stop member 96 (FIGS. 2 and 4) is attached to the fixed housing 22 and extends outward into the upper recess 95. Thus, if the yaw axis stop plate 86 is rotated clockwise or counterclockwise with the yaw journal housing 19 relative to the fixed housing 22 by movement of the handle support, the sloping sides of the stop plate 86 will engage one of the sides of the roll axis stop member 96 and limit movement of the handle support about the roll axis.

Figure 7:
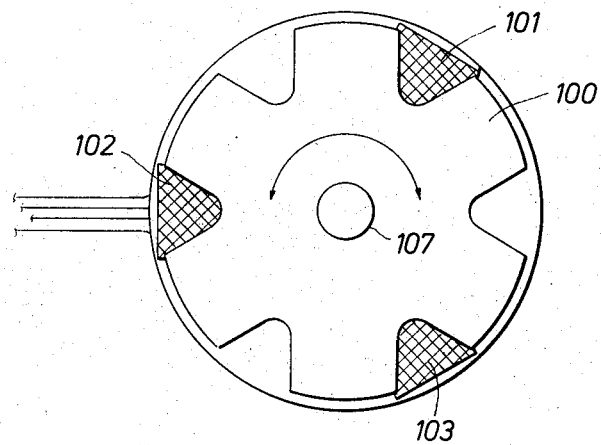
FIG. 7 is a cross-sectional view of a transducer with illustration of a rotor magnet for producing indications of direction of rotation.
Figure 8:
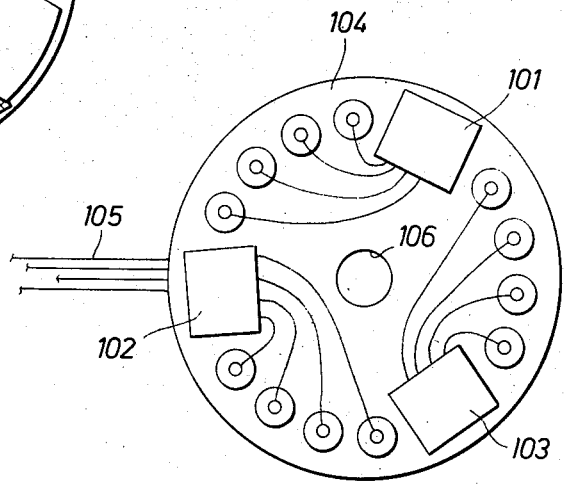
FIG. 8 is a cross-sectional view of a transducer illustrating Hall Effect generators and electrical conductors as used for producing indications of directions or rotation.

Referring now to FIGS. 7 and 8, there may be seen a triple-redundant solid state transducer that produces three electrical outputs which, by means of electrical conductors, may be transmitted to further control means for control of the roll, pitch, and yaw functions of a flight craft. The transducer housing has a cylindrical shaped configuration and includes a six pole rotor magnet 100. These equiangularly spaced Hall Effect generators 101, 102, and 103 are mounted in an end plate 104 with the leads being passed through teflon press-fit terminals to be collected in an output cable 105. The "null" position of the rotor relative to the generators 101, 102, and 103 is illustrated in FIG. 7. The shaft 107 on the rotor 100 passes through the shaft opening 106 in the plate mounting the generators. A shaft 107 is directly coupled to the pin 36, pin 81 or pin 92 of the mechanisms heretofore described. The plate mounting the generators is associated with the rotor 100 in a housing (not shown) where rotation of the rotor relative to the generators is obtained. Rotation of the magnet in a clockwise direction or counterclockwise direction causes the generators to produce a (+) or (−) proportional output signal. In operation, an excitation current is supplied to the generators in a well known manner. One of the advantages of this arrangement of transducers is that there is a triple redundancy in the use of generators which, of course, greatly increases reliability. The direct coupling of the transducer with the controller eliminates mechanical loss inherent in mechanical systems and there is no wear problem in the transducer as there is no physical contact between the magnet rotor and the generator.

In the device as shown in FIGS. 7 and 8 the magnet and generator orientation are such that in a neutral position the output voltage is zero—a displacement in one direction causing an output of one polarity and a displacement in the other direction producing a reverse polarity.

Insofar as transducers are concerned, as the transducers of FIGS. 7 and 8 illustrate, a shaft can produce rotation of one plate relative to another plate. It is possible to substitute other motion detecting means in such an arrangement. For example, a radioactive light source can be inset on a rotor and displaced relative to a photovoltaic cell. Displacement of the light source with respect to the photovoltaic cell produces an electrical output from the cell. By appropriate configuration of the cell or the relative motion path, the output can be made linear or non-linear.

While but one embodiment of the invention has been shown and described, various changes can be made in the construction of the parts without departing from the spirit and scope of the invention as will be understood by those skilled in the art.

What is claimed is:

1. A controller for producing control functions relative to three mutually perpendicular axes comprising
   a support member,
   a housing rotatively mounted on said member for pivotal movement about a first axis, first transducer means including a shaft control element extending along said first axis and coupled to said housing,
   a control element rotatively mounted on said housing for pivotal movement about a second axis, said second axis being perpendicular to said first axis, second transducer means including a shaft control element extending along said second axis and coupled to said control element,
   a hand grip rotatively mounted on said control element for pivotal movement about a third axis, said third axis being perpendicular to said first and second axis, third transducer means including a shaft control element extending along said third axis and coupled to said hand grip, and
   said transducers respectively including a magnetic rotor with a plurality of pole pieces attached to said shaft control element and a fixed member having at least one Hall Effect generator for producing an electrical output signal proportional to the degree of rotation of a rotor relative to the plate member.

2. The controller as defined in claim 1 and further including means for directly coupling said shaft control elements for said transducers in axial alignment with the respective first, second, and third axes.

3. The controller as defined in claim 2 wherein there are at least three Hall Effect generators equiangularly spaced about said shaft control element and said magnetic rotor includes at least 6 pole pieces.

4. The controller as defined in claim 2 and further including resilient force means respectively coupled relative to the shaft control element for each of said transducers and to each of said housing, said control element and said hand grip for provide a neutral force location for said housing, said control element and said hand grip relative to said transducer means, said housing, said control element, and said hand grip being rotatable about their respective axes against the effect of said resilient force means.

5. The controller as defined in claim 4 and further including means for limiting the respective relative rotation of said housing, said control element and said hand grip.

6. The controller as defined in claim 4 wherein said control element is pivotally mounted in said housing for rotation about said second axis which is a longitudinal axis extending through said control element, said housing is pivotally mounted in said support member for rotation about said first axis which is an axis transverse to and intersecting said second axis, said hand grip is pivotally mounted on said control element for rotation about said third axis which is an axis transverse to and intersecting said second axis.

7. The controller as defined in claim 6 wherein said hand grip has a hollow interior which receives one end of said control element and said pivotal mounting is within the interior of said hand grip, said hand grip having interior surfaces and said interior and exterior surfaces being arranged to limit pivotal rotation of said hand grip relative to said control element.

8. The controller as defined in claim 7 wherein said housing has first means thereon defining spaced-apart stop surfaces and said control element has a projecting part disposed between said stop surfaces for limiting the rotation of said control element relative to said housing.

9. The controller as defined in claim 8 wherein said housing has second means defining spaced-apart stop surfaces and said support member has a projecting part disposed between said stop surfaces for limiting the rotation of said housing relative to said support member.

10. The controller as defined in claim 9 wherein said first and second means having stop surfaces are a recessed plate member secured to said housing.

* * * * *